United States Patent [19]

Bragg et al.

[11] Patent Number: 4,862,683
[45] Date of Patent: Sep. 5, 1989

[54] APPARATUS FOR HARVESTING BERRIES ON LOW PLANTS

[75] Inventors: R. Douglas Bragg; H. Lloyd Weatherbee, both of Collingwood, Canada

[73] Assignee: Doug Bragg Enterprises Ltd., Canada

[21] Appl. No.: 753,524

[22] Filed: Jul. 10, 1985

[30] Foreign Application Priority Data

Jul. 9, 1985 [CA] Canada ................................. 486516

[51] Int. Cl.⁴ ............................................ A01D 46/00
[52] U.S. Cl. ................................ 56/330; 56/328 R; 56/DIG. 10
[58] Field of Search .................................. 56/330–331, 56/328 R, DIG. 10–DIG. 11, 14.9, 15.9, 16.1, 17.2, 16.5

[56] References Cited

U.S. PATENT DOCUMENTS

| | | | |
|---|---|---|---|
| 1,193,189 | 8/1916 | Richter | 56/330 |
| 1,233,089 | 7/1917 | Maglathlin | 56/330 |
| 1,452,629 | 4/1923 | Veeder | 56/330 |
| 1,622,117 | 3/1927 | Jenkins | 56/13.5 |
| 2,220,398 | 11/1940 | Dreikosen | 171/92 |
| 2,267,879 | 12/1941 | Tillitt | 171/92 |
| 2,426,545 | 8/1947 | Young | 171/108 |
| 3,130,791 | 4/1964 | Schmidt | 171/53 |
| 3,165,876 | 1/1965 | Towson | 56/13.5 |
| 3,252,520 | 5/1966 | Hill et al. | 56/229 X |
| 3,473,613 | 10/1969 | Boyce | 171/14 |
| 3,616,630 | 11/1971 | Gray et al. | 56/330 |
| 3,648,447 | 3/1972 | Burton | 56/330 |
| 3,885,375 | 5/1975 | Solterbeck | 56/DIG. 11 X |
| 3,918,239 | 11/1975 | Aldred et al. | 56/17.2 X |
| 4,162,606 | 7/1979 | Weichel | 56/DIG. 10 X |
| 4,335,570 | 6/1982 | Fitzmaurice | 56/330 X |
| 4,343,138 | 8/1982 | Neverburg | 56/DIG. 10 X |
| 4,402,175 | 9/1983 | Watenpaugh | 56/330 X |
| 4,464,890 | 8/1984 | Scholtissek et al. | 56/17.2 X |
| 4,519,191 | 5/1985 | Ledebuhr et al. | 56/330 X |

FOREIGN PATENT DOCUMENTS

| | | |
|---|---|---|
| 0102113 | 3/1906 | Canada . |
| 0189690 | 4/1919 | Canada . |
| 0522106 | 2/1956 | Canada . |
| 0523354 | 4/1956 | Canada . |
| 0609861 | 12/1960 | Canada . |
| 0638778 | 3/1962 | Canada . |
| 0668287 | 8/1963 | Canada . |
| 0672558 | 10/1963 | Canada . |
| 0724370 | 12/1965 | Canada . |
| 0733269 | 5/1966 | Canada . |
| 0749625 | 1/1967 | Canada . |
| 0764174 | 8/1967 | Canada . |
| 0778224 | 2/1968 | Canada . |
| 0783881 | 4/1968 | Canada . |
| 0798585 | 11/1968 | Canada . |
| 0811939 | 5/1969 | Canada . |
| 0828424 | 12/1969 | Canada . |
| 0860596 | 1/1971 | Canada . |
| 0880628 | 9/1971 | Canada . |
| 0901817 | 6/1972 | Canada . |
| 0916932 | 12/1972 | Canada . |
| 0942071 | 2/1974 | Canada . |
| 0950685 | 7/1974 | Canada . |
| 0959656 | 12/1974 | Canada . |
| 0988724 | 5/1976 | Canada . |
| 1019960 | 11/1977 | Canada . |
| 1023634 | 1/1978 | Canada . |
| 1078192 | 5/1980 | Canada . |
| 1097086 | 3/1981 | Canada . |

Primary Examiner—Kyle L. Howell
Assistant Examiner—Angela D. Sykes
Attorney, Agent, or Firm—Stevens, Davis, Miller & Mosher

[57] ABSTRACT

Apparatus for harvesting berries on low plants incorporating means enabling the machine to accommodate the rugged terrain often encountered during use. The apparatus efficiently picks low bush berries such as blueberries, with a minimum of damage both to the plants and the berries. The apparatus can be connected to and powered from a wide range of conventional farm tractors. The harvester is rugged and durable and reasonable in cost.

23 Claims, 10 Drawing Sheets

APPARATUS FOR HARVESTING BERRIES ON LOW PLANTS

BACKGROUND OF THE INVENTION

This invention relates to improved apparatus for harvesting crops such as berries on low plants and in particular is directed to apparatus for harvesting low bush (commonly known as wild) blueberries.

Over the past many years blueberries have been picked using manual labor. In early years the blueberries were simply picked by hand in suitable containers; however this slow, tedious procedure is totally unsuited for commerical operations. Consequently, picking rakes were developed allowing workers to strip the blueberries from the plants with the stripped blueberries, together with a certain amount of debris, being thereafter put through a fanning machine to remove the debris.

In more recent years the demand for wild blueberries has increased substantially and significant export markets have been developed. In certain areas, the demand for manual labor during the relatively short picking season has placed a strain on the available labor pool. Current labor rates also place a strain on profit margins so therefore the need has arisen for apparatus capable of harvesting a substantial acreage of berries per unit of time in an acceptable manner.

A number of years ago experimental work was carried out at the University of Maine in an effort to develop a commercial blueberry harvester. The picking head there developed was incorporated into a harvesting machine which is described in Canadian Patent No. 961,275 issued Jan. 21, 1975 and equivalent U.S. Pat. No. 3,648,447 naming Charles G. Burton as inventor. Although a substantial amount of work went into this machine in an effort to make it work properly, such efforts, at least in part, were considered unsuccessful by those skilled in the art and the machine was not a commercial success. The machine was incapable of withstanding the rugged conditions encountered during use, was prone to damage, and did not pick nearly as efficiently as was initially predicted.

SUMMARY OF THE INVENTION

It is an object of the present, invention to provide improved apparatus for harvesting crops such as berries on low plants which incorporates means enabling the machine to accommodate the rugged terrain often encountered during use. A further object is to provide apparatus for efficiently picking low bush berries with a minimum of damage both to the plants and the berries. A further object is to provide harvesting apparatus which can be connected to and powered from a wide range of conventional farm tractors. A further object is to provide a harvester of the type described which is rugged and durable and at the same time reasonable in cost.

The apparatus for harvesting berries on low plants as described in detail hereinafter typically comprises a picking head including a frame movable along the ground over the crop of berries in the path of travel. A reel is mounted on this frame for rotation about an axis transverse to the travel path. This reel includes a series of circumferentially spaced rows of tines capable of moving and engaging the berries to strip them from the plants. A cam arrangement is provided for moving the tines relative to the reel to facilitate the stripping action and to facilitate deposit of the stripped berries into the reel. A conveyor is provided to carry the berries which have been deposited into the reel outwardly of same and thence ultimately into a container.

In accordance with one aspect of the present invention the above-noted frame is provided with special means for supporting the picking head on the ground for movement over same such that the picking head closely follows the contours of the ground. Special means are also provided for towing the picking head such that it is free to move upwardly or downwardly and to pitch and roll as the supporting means moves over irregularities on the ground surface. In the preferred form of the invention the picking head supporting means includes a pair of spaced apart skids which, in profile, include a smoothly convexly contoured frontal section emerging into more shallowly curved intermediate and rear sections. Extensive experimentation has shown that this arrangement allows the picking head and its picking reel to closely follow the irregularities on the ground surface thus assisting in providing for an efficient picking operation. The concept of towing the picking head, as opposed to pushing it, is also of importance and the towing means herein provided includes a bracket adapted to be fixed to a conventional tractor with a towing arm extending outwardly therefrom. A towing assembly is adapted to be interconnected between the arm and picking head and as is arranged to allow the previously noted motions of the picking head to take place during movement over the ground as it is towed alongside of the tractor.

The towing assembly preferably comprises a towing yoke connected to the picking head to permit relative pitching motion between them about an axis transverse to the path of travel. The yoke is also connected to the towing arm to permit relative rolling motion and pivotal motion between them. The stabilizer bar may be also connected to the frame to prevent substantial lateral motion of the picking head relative to the tractor.

As a further feature of the invention a hoisting lever is arranged to be pivotally connected at an inner end of same to the tractor and a hydraulic ram is connected for raising and lowering the lever. Suitable means are provided for connecting the outer end of the lever to the picking head such that the picking head may be lifted up and lowered downwardly together with the lever. The above-noted connecting means (e.g. a chain arrangement) is preferably arranged such that during lifting of the head upwardly, the frontal part of the picking head is initially lifted to cause the picking head and the skids thereon to rotate rearwardly thereby to assist same in clearing obstructions on the ground.

In accordance with a further aspect of the invention the above-described harvesting apparatus incorporates a special conveyor for transporting the berries. The conveyor accordingly includes a belt consisting of a plurality of rigid sections or modules hinged together to form an endless flexible loop. Special sprockets are adapted to co-operate and engage with the belt sections to positively drive same in the endless path provided. Certain of these sections include flights to positively transport the berries. This arrangement represents a vast improvement over certain prior art arrangements which attempted to employ conventional conveyor belt and pulley arrangements for conveying the berries. These earlier arrangements proved to be ineffective in that crushed berries soon contaminated the belt surfaces causing slippage of the belts relative to their drive pulleys. However, with the positively driven special conveyor belts described herein this condition has been essentially eliminated.

In accordance with a still further aspect of the invention, the above-noted cam means for moving the picking tines is shaped such that during reel rotation the tines open gradually while descending prior to engaging the plants so as to enter the plants with little disturbance and to thereafter close while retaining the berries stripped therefrom, the tines thereafter gradually opening as they ascend to continue to hold the berries therein; in particular, the cam is shaped to cause the tines to first close rapidly and to immediately thereafter open rapidly directly before the tines complete their ascent thereby to more efficiently release the berries from the tines and to deposit same on the conveyor.

According to a still further feature of the invention hydraulic motor means are provided for driving the reel and the conveyor means. The hydraulic motors together with suitable control valves readily enables the rotational speed of the reel to be adjusted relative to the rate of travel of the picking head along the ground thereby to optimize the stripping action. As described hereafter, the reel speed is adjusted so that each plant is raked a multiplicity of times in succession thereby to effectively remove the berries from same.

As described hereafter a rotary brush is also arranged to rotate with its bristles in contact with a peripheral portion of the reel to clear debris from the tines. The hydraulic motor which drives the brush also serves to drive a section of the conveyor means which extends inside of the reel.

Additional advantages and features of the invention will become apparent from the following detailed description of a preferred embodiment of the invention.

BRIEF DESCRIPTION OF THE VIEWS OF DRAWINGS

In the drawings which illustrate a preferred embodiment of the present invention:

DETAILED DESCRIPTION OF PREFERRED EMBODIMENT

Figure 1:
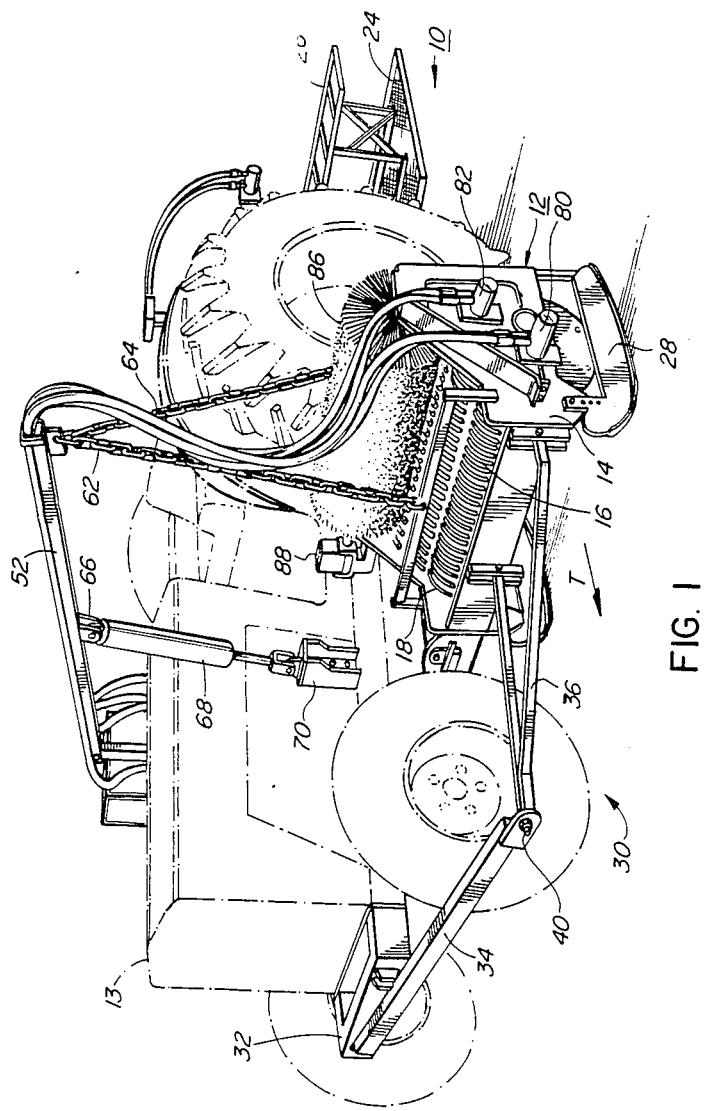
FIG. 1 is a perspective view of the berry harvesting apparatus in accordance with the invention with the conventional farm tractor being shown in phantom.

Referring now to the drawings there is shown at Figures as an example of a harvester 10 according to the invention including a picking head 12 located alongside a conventional farm tractor 13. (shown in phantom).

The picking head includes a frame 14 which is movable along the ground over the crop of berries in a path of travel given by the arrow T, such picking head including a reel 16 mounted on frame 14 for rotation about an axis transverse to the path of travel. Reel 16 is provided with a series of circumferentially spaced row of tines 18 adapted to move and to engage the blueberries to strip them from the plants. The picking head also includes a cam arrangement (to be described hereafter) for moving the tines 18 relative to the reel 16 to facilitate the stripping action and to facilitate deposit of berries into the reel. A primary conveyor arrangement 20 extending inside of the reel 16 serves to carry the berries outwardly of the reel and to deposit same into a secondary conveyor 22, the latter extending rearwardly and thence upwardly and outwardly of the rear end of the tractor.

A horizontal platform 24 is mounted at the rear of the tractor and includes suitable brackets thereon for connection to the hydraulically activated tractor hitch points (not shown). This permits the platform to be raised or lowered. The platform 24 includes a raised subplatform 26 upon which suitable containers (not shown) may be positioned thereby to receive berries passing rearwardly, upwardly and thence outwardly on the secondary conveyor 22.

The picking head frame 14 is provided with a laterally spaced apart pair of skids 28 which, during use, serve to support the picking head 12 directly on the ground for sliding movement thereover. Hence, during operation, the picking head 12 closely follows the contours of the ground.

The harvesting apparatus also includes a mechanism 30 for towing the picking head 12 such that the picking head is free to move upwardly or downwardly and to pitch and roll as the spaced apart skids 28 move over irregularities on the ground surface. This freedom of the picking head to move in such a way as to closely follow the ground contour is most important to a successful picking operation.

The above-noted towing mechanism 30 includes a bracket 32 adapted to be fixed to the front end of the tractor with a towing arm 34 extending laterally outwardly beyond the front wheel of the tractor. A towing yoke 36 is pivotally connected to the picking head 12 at spaced apart pivot points 38 which permit relative pitching motion between the yoke 36 and picking head 12 about a horizontal axis transverse to the path of travel. Additionally, the front end of the yoke 36 is connected at a single point to the arm 34. This single point connection is provided by a forwardly extending stud 40 on the towing yoke which extends through aperture 42 provided in a bracket secured to the outer end of towing arm 34 with a suitable lock nut being secured on stud 40. By virtue of this single point connection the yoke 36 is permitted to have relative rolling motion and pivotal motion with respect to the arm 34. However, in order to prevent substantial lateral deviation of the picking head 12 relative to the tractor, a stabilizer bar 44 extends laterally below the mid point of the tractor to a bracket (not shown) located on the other side of the tractor to which the inner end 46 of the stabilizer bar is pivotally attached. The opposite end of stabilizer bar 46 is pivotally secured at pivot point 48 to the frontal end of the frame of the secondary conveyor 22 and also via a pivot member 50 to a pivot bracket located at the inner end of picking head 12.

Figure 2:
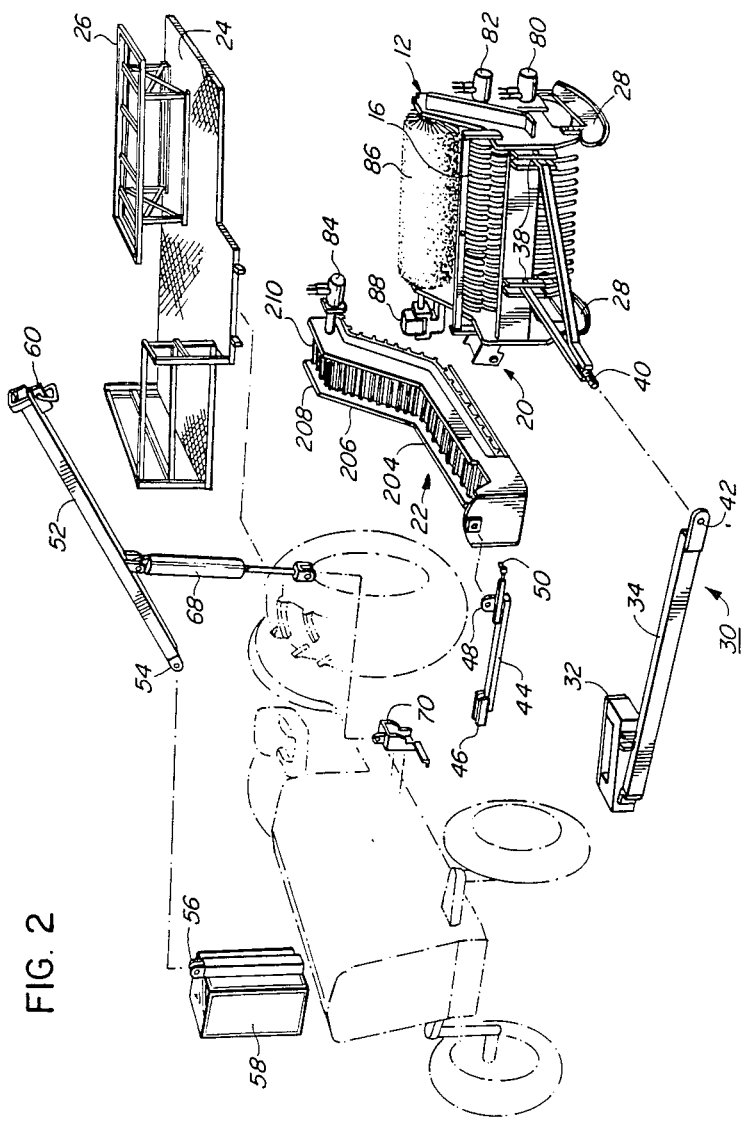
FIG. 2 is an exploded perspective view of the harvesting apparatus.
Figure 3:
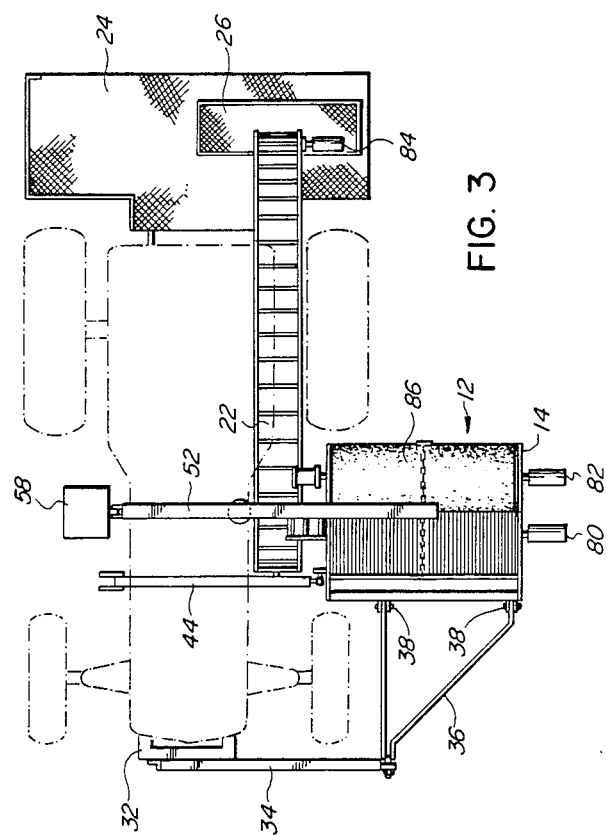
FIG. 3 is a plan view thereof.

With continued reference to FIGS. 1-3, a hoisting lever 52 is pivotally connected at its inner end 54 to an upstanding bracket post 56 fixedly secured to the tractor. Also secured to post 56 is a reservoir tank 58 which holds the hydraulic oil for the lift system and hydraulic motors. The outer end 60 of hoisting lever 52 is connected via fore, and aft chains 62 and 64 respectively to front and rear portions respectively of the picking head 12 as best illustrated in FIG. 1. Intermediate portion of lever 52 is provided with a bracket 66 which is pivotally connected to hydraulic cylinder 68. The ram of the hydraulic cylinder is pivotally connected to bracket 70 secured firmly to the tractor. Hence, as the ram of cylinder 68 is extended and retracted, the lever 52 is raised and lowered with the picking head 12 being raised and lowered accordingly.

It should be noted here that the fore and aft chains 62 and 64 are arranged such that as hoisting lever 52 is raised upwardly, the frontal portion of the picking head 12 is initially lifted so as to cause the picking head 12 and its supporting skids 28 to rotate rearwardly thereby to assist the skids in clearing obstructions on the ground. This can be easily achieved by adjusting the relative lengths of chains 62 and 64 i.e. by making chain 62 relatively shorter than chain 64.

Figure 4:
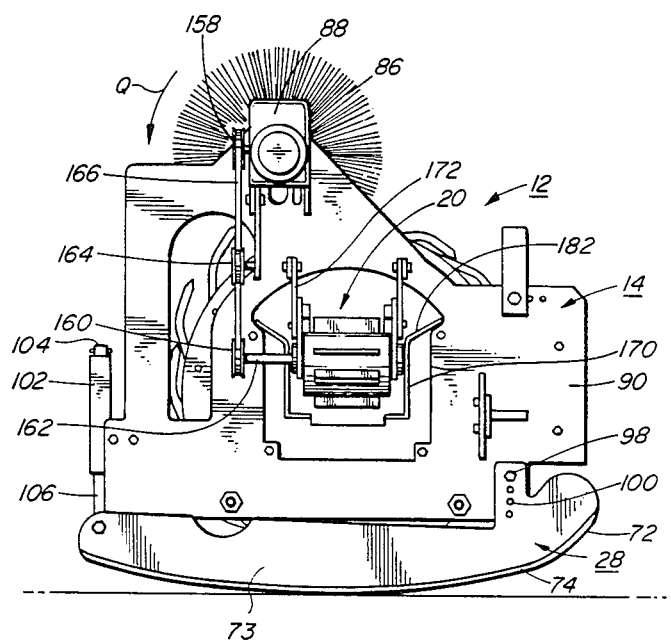
FIG. 4 is an elevation view of the inner end of the picking head.

The profile shape or contour of the supporting skids 28 is best illustrated in FIG. 4. It will be noted that the frontal portion 72 of each skid is smoothly convexly contoured in a relatively pronounced manner. This frontal section 72 merges into a more shallowly convexly curved intermediate and rear section 73. The smoothly convexly curved contour arrangement of the skids 28 substantially prevents digging in of the front portions of the skids in rough terrain and at the same time encourages the to and fro pitching movement of the picking head 12 as humps and hollows in the terrain are encountered. Additionally, the lower edges of skids 28 are each provided with a skid plate 74 of sufficient width as to prevent digging in of the skids during movement over the usual surfaces encountered during use and at the same time they prevent overly rapid wear of the skids during use.

The farm tractor is equipped with a suitable commercially available hydraulic pump (not shown) which supplies, via flexible lines and suitable commercially available control valves (not shown) the hydraulic motors 80, 82 and 84.

Hydraulic motors 80 and 82 are mounted on the outer end of the picking head frame 14 while hydraulic motor 84 is mounted to the rear end of the frame of the secondary conveyor 22. Motor 80 serves to drive reel 16 in rotation about its axis by way of a chain and sprocket drive to be described hereafter. Hydraulic motor 82 serves to drive elongated tine cleaning brush 86 in rotation about its axis, with the latter serving to drive, via gear reduction unit 88 on the inner end of picking head frame 14, the primary conveyor 20.

With reference now to FIGS. 4 through 13, the picking head 12 will now be described more fully.

Figure 5:
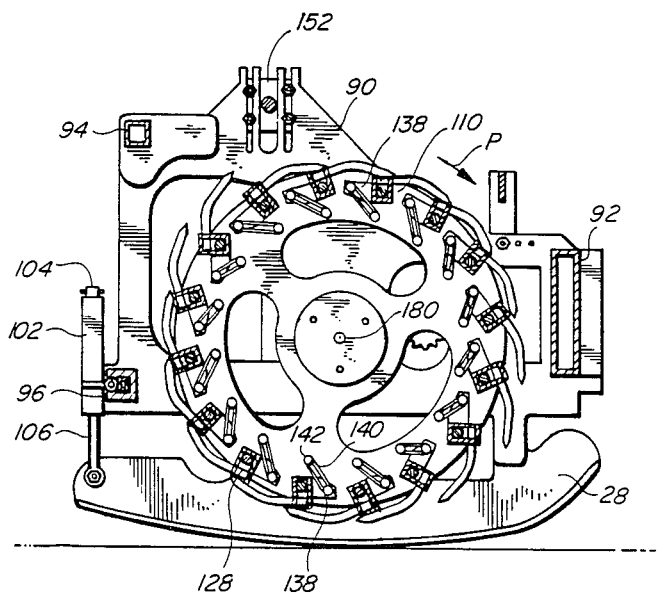
FIG. 5 is a cross-section view of the picking head looking toward the outer end of the reel.
Figure 6:
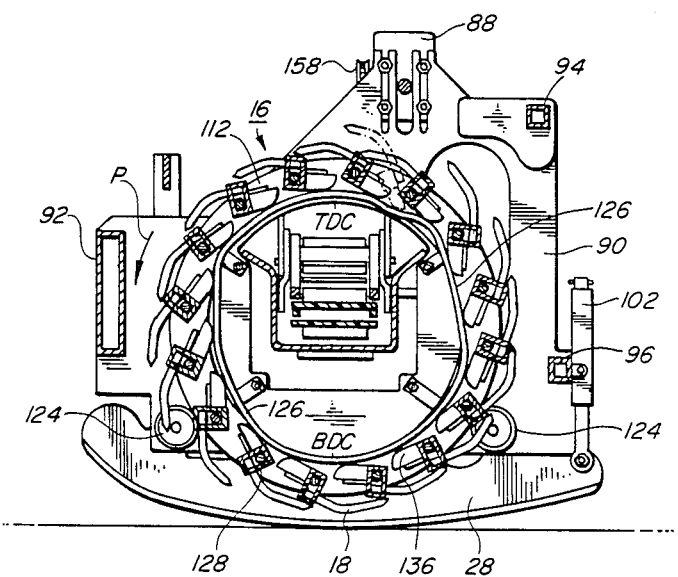
FIG. 6 is a view similar to that of FIG. 5 but looking toward the opposite end of the picking reel.

The previously mentioned picking head frame 14 includes a spaced apart parallel pair of side plates 90 which are rigidly secured together in spaced apart relationship by transversely extending cross-frame members 92, 94 and 96 as shown in FIGS. 5 and 6 for example. Each of the previously described skids 28 is connected adjacent a lower edge of a respective side plate 90 with the frontal portion of each skid 28 being connected to side plate 90 via bolt 98 with a series of adjustment holes 100 being provided in each skid 28 to allow for a height adjustment to be made at the front end of the skid. The rear end of each skid 28 is connected to the frame 14 via cross-member 96 and a height adjustment device 102. Height adjustment device 102 is provided wit internal threads (not shown) such that when the upper end portion 104 of same is rotated by a suitable wrench, the support element 106 telescopes inwardly or outwardly of device 102 thus effecting a rear end height adjustment in a rapid and convenient manner.

The reel 16 is rotatably mounted within frame 14, the reel 16 including opposed end plates 110 and 112 as best seen in FIGS. 5 and 6. Both end plates 110 and 112 have a circular outline and end plate 110 is journalled in hub 112 affixed to a frame side plate 90 (see FIG. 7). A short shaft section extending outwardly from the center of reel end plate 110 and through hub 113 has a drive sprocket 114 keyed thereto, such sprocket being driven in rotation by hydraulic motor 80 via sprocket 116 and roller-link drive chain 118. Hydraulic motor 80 is mounted on a bracket 120 secured to frame side plate 90 with the other hydraulic motor 82 also being mounted to an extension portion of that bracket.

Figure 7:
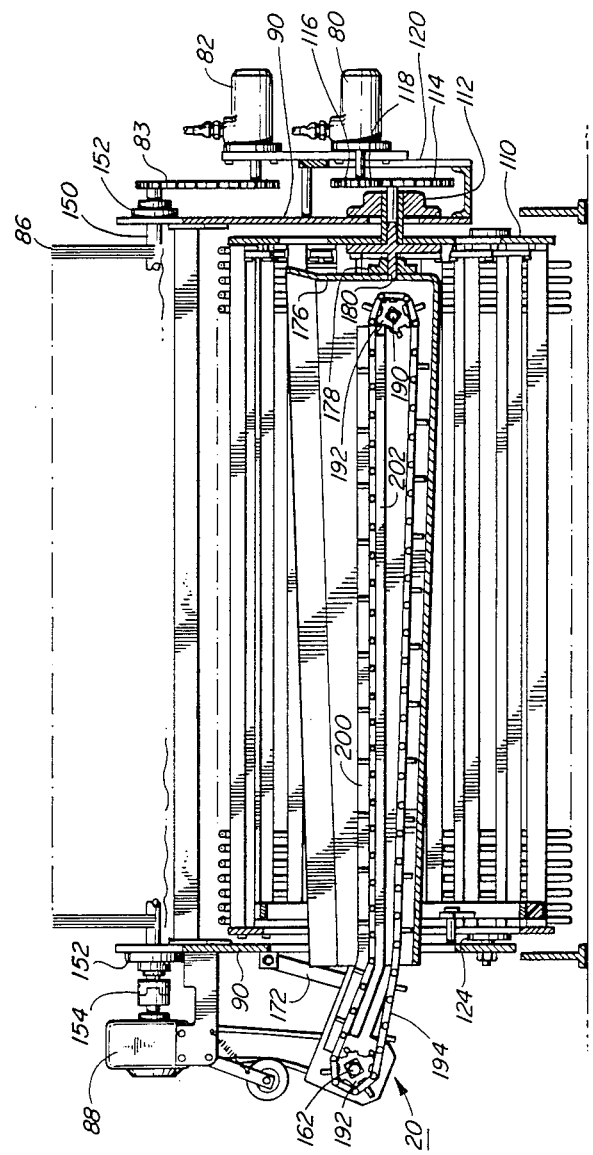
FIG. 7 is a longitudinal section view of the picking head.

As is best seen in FIGS. 4, 6 and 7, the primary conveyor 20 extends axially within the reel and outwardly through one end of same. In order to accommodate this primary conveyor 20, the opposite reel end plate 112 must have an open center. Accordingly, in order to rotatably support reel end plate 112, a pair of rollers 124, journalled on suitable needle bearings, are mounted adjacent the lower edge of the frame side plate 90 associated with reel end plate 112. These rollers contact lower peripheral edge portions of the reel end plate thus securely supporting same during rotation of the reel 16. This same frame end plate 90 also has bolted to it a ring-like cam 126. This cam 126 serves to provide for opening and closing of the tines in a manner which will now be described more fully.

Figure 12:
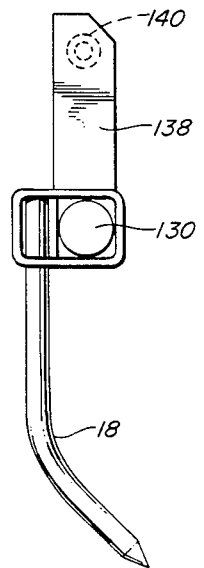
FIGS. 12 and 13 are opposite end views of a tine bar.
Figure 13:
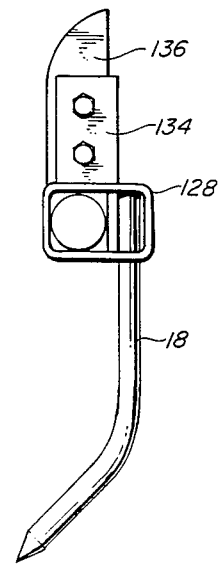

It should be noted that the individual tines 18 are mounted in spaced parallel relation on elongated tine bars 128 which extend across from one reel end plate 110 to the other reel end plate 112. Each tine bar comprises a tubular member of generally rectangular cross-section as best seen in FIGS. 12 and 13, each tine bar being drilled at spaced intervals to receive the ends of the tines 18 which are then welded relative to their associated tine bars 128. Elongated tine bar support rod 130 extends through the center of each tine bar 128. The opposing ends of each support rod 130 are drilled and tapped to receive threaded studs 132, the latter passing through peripherally spaced apertures provided adjacent the outer peripheries of each of the reel end plates 110 and 112. Accordingly the peripherally spaced support rods 130 serve to rigidly secure the reel end plates 110 and 112 in their parallel spaced apart relationship while at the same time providing support for the tine bars 128 and also allowing the tine bars 128 to rotate thereon thus allowing the tine sets mounted to each tine bar to open and to close during rotation of reel 16 thereby to facilitate the berry stripping action etc. It will be appreciated here that the tines 18 are spaced apart just sufficiently as to allow the berries to be stripped from the plants. A typical tine 18 as illustrated may have a total length in the order of 5 ½" and a 5/16" diameter, with the outer portion of the tine bent at approximately a 45 degree angle to the shank of the tine. These tines are typically spaced along the tine bar 128 with a 17/32" center to center spacing. The tine tips are pointed as shown in FIGS. 12 and 13.

Each tine bar 128 is provided with a cam follower as best shown in FIG. 13 comprising a bracket 134 to which is bolted a smoothly contoured follower body 136 made of a low-friction material such as ultra high molecular weight polypropylene. The opposite end of each tine bar is provided with a short lever 138 welded thereto and provided with short stud 140 at its outer end.

Figure 9:
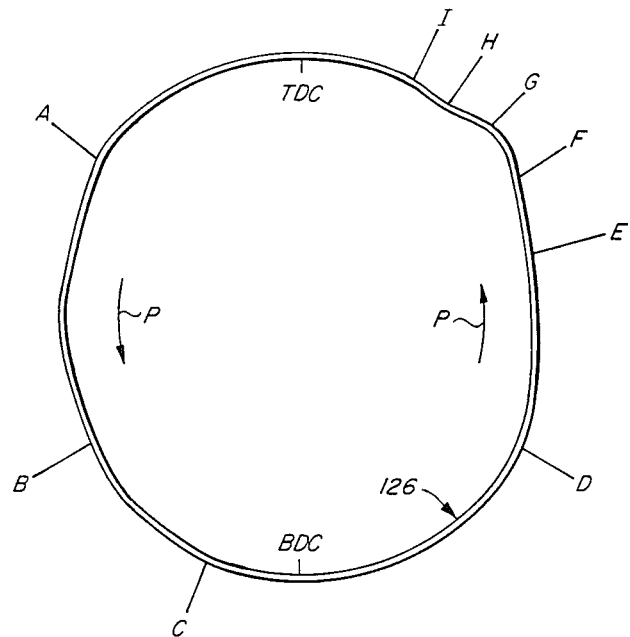
FIG. 9 illustrates the cam for moving the tines.

Referring now to FIG. 6, the reel end plate 112 is shown together with the peripherally spaced apart tine bars 128 and their attached sets of tines 18. As previously noted each tine bar is provided with a cam follower 136 which closely engages the periphery of the previously noted cam 126 which is fixed relative to the frame end plate 90. With reference to FIG. 5 the opposite reel end plate 110 is illustrated along with the peripherally spaced tine bars 128 each being provided adjacent the end of same with a short lever 138. The studs 141 at the outer ends of these levers each have a sturdy elastic, band 141 connected thereto, each elastic band 141 also passing around an associated pin 142 mounted in the plate 110. The strong elastic bands 141 serve to bias the cam followers 136 into close contacting relationship with the periphery of the ring-like cam 126. Therefore, as the reel 16 rotates in the direction of arrow P as shown in FIGS. 5 and 6, with the cam followers 136 in contact with the cam 126, the tine bars 128 are made to pivot about their respective support rods 130 in the predetermined cyclical fashion as determined by the shape or contour of cam 126 thereby causing the sets of tines on the respective tine bars 128 to open and close to facilitate the berry stripping action and to ensure that the stripped berries are conveyed upwardly and subsequently directed into the central portion of the reel onto the axially extending primary conveyor 20. The particular movement imparted to the sets of tines 18 is illustrated in FIG. 9 which illustrates the shape of the ring-like cam 126. The direction of rotation of reel 16 relative thereto is given by the arrows P. The letters TDC and BDC represent the top dead center and bottom dead center positions respectively of the tines.

With continued reference to FIG. 9, it will be assumed that a particular set of tines 18 has rotated past the TDC position and is moving toward position A. During the course of this movement the tines 18 are essentially in their closed positions. However, beginning at point A, the shape of cam 126 begins to change with the result being that the tines 18 open slowly toward point B. This gradual opening motion, combined with the forward motion of the harvester as a whole, permits the tines to enter into and engage the plants with relatively little disturbance. However, after point B is reached the tines 18 gradually close with the stripping of the terries occurring in this region, with the tines being fully closed by the time point C is reached, such tines 18 remaining closed through the BDC position and thence upwardly to the point D position where the tires begin to open slowly thereby to assist in retaining the berries on the tines 18 and tine bars 128 and preventing premature deposition of the berries into the central portion of the reel. After point E is reached however tines 18 begin to close slowly until point F is reached and between points F and G the tines close rapidly followed by rapid opening between points G and H followed again by rapid closure between points H and I. This rapid close-open-close motion serves to overcome the effects of centrifugal forces on the berries and to positively throw same onto the primary conveyor 20 within the reel and the rapid opening action serves to release any berries which may be momentarily stuck between the tines.

In a typical embodiment of the invention the above-described tine bars 128 are peripherally spaced about a circle having a diameter of, for example, 20 inches. The harvester ground speed is typically in the order of 2 miles per hour. The reel 16 is driven by hydraulic motor 80 in an overspeed condition such that each blueberry plant is successively raked by a multiplicity of sets of tines e.g. each plant is preferably raked about three times over. This helps to ensure an effective and efficient stripping of the berries.

In order to clear dirt and debris from the tines during operation, the aforementioned cylindrical brush 86 rotates in contact with the tines 18 during the period of time that the closed tines are moving over the TDC position shown in FIG. 9. Thus as brush 86 rotates in a direction of arrow Q shown in FIG. 4, pieces of plant material are effectively removed from the tines and flung away to a point where they will cause no further problems. This brush is rotated by hydraulic motor 82 via chain and sprocket mechanism 83 at a speed of between 500 and 800 RPM. The shaft 150 of brush 86 is journalled adjacent its opposing ends in bearing blocks 152, the latter being mounted adjacent the upper edges of the frame end plates 90 in slotted guideways permitting shaft 150 to be adjusted upwardly or downwardly thereby to provide for the correct amount of brush to tine contact. In a typical embodiment the brush is provided with a 12" outside diameter and a 2" diameter core. The brush may of the spiral wound variety (such as is typically used in street cleaning equipment) and the bristles are typically of medium density polypropylene having a diameter of 0.060 inch.

The inner end of shaft 152, which supports brush 86, is connected via coupling 154 to the right angle gear drive 88, the latter being mounted via a bracket to the frame end plate 90. The right angle gear drive 88 includes a pulley 158 (see FIG. 4) which drives a further pulley 160 secured to shaft 162 journalled in the outer end of the frame of the primary conveyor 20. A spring biased idler pulley 164 holds the V-belt extending between pulleys 158 and 160 in tension, such V-belt being designated by reference 166. Hence, as brush 86 is driven in rotation by hydraulic motor 82, motive power is also supplied via the gear drive 88 and belt 166 etc. to the belt of the primary conveyor 20.

Referring now particularly to the primary conveyor 20, it will be noted that the same includes an elongated somewhat trough-like metal frame 170. The outer end of conveyor frame 170 is suspended from frame end plate 90 by way of a pair of support brackets 172 (see FIG. 4). Since the opposite end of conveyor frame 170 is located entirely within the rotating reel 16, special means must be provided for its support. Therefore, in order to accomplish this, the inner end wall 176 of the conveyor frame is provided with a bearing hub 178 within which is journalled a stub shaft 180 concentric with and mounted to the reel end plate 110 as best seen in FIGS. 5 and 7. Hence, by virtue of this arrangement, rotation of the reel 16 is permitted while at the same time the inner end of the conveyor frame 170 is securely supported by the stub shaft 180 located within bearing hub 178 attached to the end wall of the conveyor frame.

In order to facilitate entry of berries into the primary conveyor 20, tee conveyor frame 170 is provided with opposing side walls, the upper portions of which, designated 182, flare upwardly and outwardly into relatively close proximity to the circumferentially spaced apart tine bars 128. In order to avoid problems arising from mechanical interference, the outwardly flaring sidewall portions 182 are provided adjacent their extremities with flexible strip portions which come in very close proximity with the tine bars thus assisting in ensuring that all of the berries deposited into the reel in the manner described previously are captured by the primary conveyor.

Figure 10:
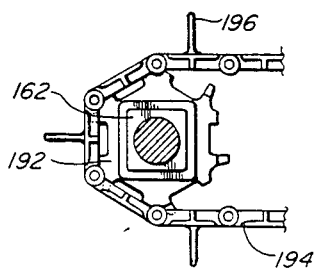
FIG. 10 is a view illustrating a portion of the conveyor belt and drive sprocket therefor.
Figure 11:
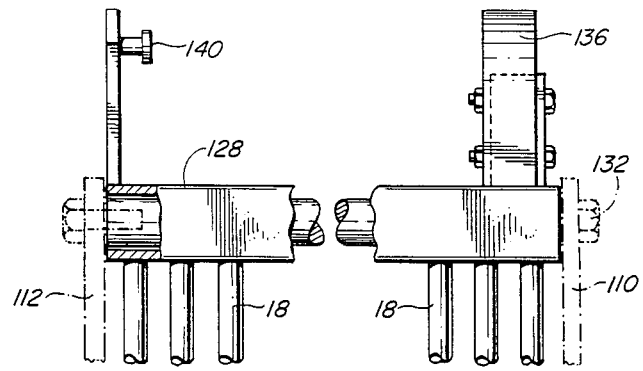
FIG. 11 is a fragmentary view of a tine bar and the manner of mounting same.

With reference again to FIG. 7, it was previously noted that the primary conveyor 20 includes an outer drive shaft 162 journalled by a suitable bearings in the outermost end of the conveyor frame 170. Adjacent the opposite end of the conveyor frame there is provided a rotatable idler shaft 190. These shafts are each provided with an axially spaced apart pair of sprockets 192 which engage, an elongated endless conveyor belt 194 which is preferably of the type made by Intralox, Inc. of New Orleans, U.S.A. A short segment of such belt is illustrated in FIG. 10 along with the sprocket 192. The belt is comprised of short modules of sections hinged together to provide the necessary degree of flexibility. In the arrangement shown, every second section is provided with a flight 196 to positively engage and move the berries along the conveyor. The sprockets, as shown in FIG. 10, are specially shaped so as to accommodate the modular design of the belt and the sprockets of course provide for positive drive of the belts. The sprockets have square bores which are mounted with some clearance on the square sectioned shafts thereby to allow axial movement of the sprockets in response to dimensional changes resulting from temperature fluctuations etc. As best seen in FIG. 7, the upper run of conveyor belt 194 is confined at its opposed marginal edges between elongated vertically spaced apart plastic strips 200 and 202 which are firmly attached to the opposing side walls of the conveyor frame 170. The opposing ends of the flights 196 on the belt are set inwardly from the marginal edges of the belt thereby to accommodate the guide strips 200, 202. By these means, the upper run of the belt is securely supported and escape of the berries is substantially eliminated as is crushing and bruising of the berries. Because of the positive sprocket drive feature, there is no slippage of the belt as is the case when conventional belts are used especially when crushed berries are present on the belt surfaces.

After the berries emerge from the end of the primary conveyor 20, they are deposited into the secondary conveyor 22 as previously noted. The frame of the secondary conveyor 22 includes a horizontal section 204, an upwardly inclined section 206 and a short horizontally extending rear section 208. The hydraulic drive motor 84 is connected to this rear section 208 and rotates a shaft having sprockets thereon thereby to positively drive the secondary conveyor belt 210. The secondary conveyor belts, sprockets associated therewith, and the means for mounting the upper flight of such belt are all essentially as described previously in conjunction with the primary conveyor 20 and hence there is no need to repeat this description here.

Figure 8:
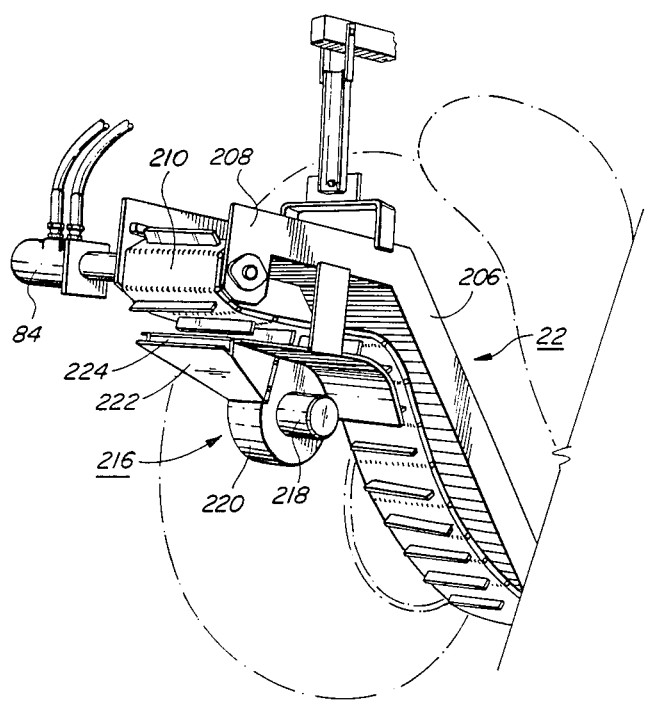
FIG. 8 is a perspective view of the rear end of the conveyor assembly.

Since the berries passing outwardly of the picking, head 12 and along the secondary conveyor 22 will be contaminated to some degree with leaves and other foreign material, a small blower arrangement 216 is mounted just below the horizontal rear end section 208 of the secondary conveyor as illustrated in FIG. 8. This blower 216 is driven by a small electric motor 218 and is provided with a fan housing 220 enclosing a centrifugal fan, the output of which is directed through an outlet nozzle 222, the slot-like mouth 224 of which is located just below the extreme terminal end of the belt conveyor 210. Thus, as the berries and debris fall downwardly from the outer end of the secondary conveyor 22, the lighter leaves and other debris are carried away from the falling berries by virtue of the stream of air being emitted from the mouth of nozzle 222. The falling berries are deposited in containers of a convenient size (not shown) which are positioned on the subplatform 26 during operation. An operator positioned on main platform 24 positions the containers as desired and, when suitably filled, stacks them in convenient locations on platform 24.

The operation of the harvester described above will be readily apparent from a review of the foregoing description. When travelling to the picking site the previously described hoisting lever 52 is in the "up" position as also is the picking head 12 thereby allowing for easy transport to the picking area. When the picking area has been reached, hoisting lever 52 is lowered downwardly until the picking head is supported on the ground by way of the previously described skids 28. The several hydraulic motors, 80, 82 and 84 are activated so as to drive reel 16, brush 86 and the primary and secondary conveyors 20 and 22 in the manner described previously. The tractor is then put in its lowest gear and made to move forwardly at slow speed e.g. about 2 miles per hour, with the result being that a swath of berries is picked from the field. In the next picking course the tractor follows the picked swath so as to avoid undue damage and crushing of the berries and the next adjacent swath is picked. During this time, by virtue of the skid mounting arrangement for the picking head, and the unique towing arrangement, the picking head is free to closely follow the contour of the terrain, and to pitch and roll and move upwardly and downwardly as required, thus ensuring that the reel 16 and picking tines 18 are in the desired close proximity to the ground during the picking operation. Since the rate of speed of the hydraulic motors may be closely controlled, variations can be made in the speed of reel rotation etc. thereby to optimize the picking operation.

Although the above-described embodiment of the invention has been constructed primarily for the picking of blueberries, it is contemplated that with suitable modifications the same general principles would apply to the picking of certain other crops such as strawberries. Additionally, in relatively rough conditions, it may be desirable to replace the single picking head design illustrated with a dual picking head arrangement, each picking head being of somewhat narrower width than that described herein. Such picking heads will be mounted on skids and towed along by apparatus very similar to that previously described. Other modifications and variations will be apparent to those skilled in this particular art after reviewing the present specification. The invention therefore is not to be limited to the specific details of construction described herein and for definitions of the invention reference is to be had to the appended claims.

We claim:

1. Apparatus for harvesting crops such as berries on low plants comprising: a picking head including a frame movable along the ground over the crop of berries in a path of travel and a reel mounted on the frame for rotation about an axis transverse to the path of travel; said reel having a plurality of circumferentially spaced rows of tines thereon adapted to move and to engage the berries and to strip them from the plants, cam means for moving said tines relative to said reel to facilitate the stripping action and to facilitate deposit of the berries into the reel, conveyor means to carry the berries outwardly of the reel and thence into a container, and wherein said frame is provided with means for supporting said picking head on the ground for movement thereover such that said picking head closely follows the contours of the ground; and means for towing said picking head such that it is free to move upwardly or downwardly and to pitch and roll as said means for supporting the picking head moves over irregularities on the ground surface.

2. Apparatus according to claim 1 wherein said towing means includes a bracket adapted to be fixed to a tractor and a towing arm adapted to extend outwardly from the tractor, and a towing assembly interconnected between said arm and said frame for towing of the picking head alongside of the tractor with said towing assembly arranged to allow the aforementioned motions of the picking head during movement over the ground as the picking head is towed alongside of the tractor.

3. Apparatus according to claim 2 wherein said towing assembly comprises a towing yoke connected to said picking head to permit relative pitching motion therebetween about an axis transverse to the path of travel, and said yoke being connected to said arm to permit relative rolling motion and pivotal motion therebetween.

4. Apparatus according to claim 3 wherein said towing yoke is connected at a single point to said towing arm.

5. Apparatus according to claim 2 further including a stabilizer bar connected to said picking head to prevent substantial lateral motion of said picking head relative to the tractor.

6. Apparatus according to claim 5 further including a hoisting lever adapted to be pivotally connected at an inner end thereof to said tractor and having a hydraulic ram connected thereto for raising and lowering said lever, and means for connecting said lever at an outer end thereof to said picking head such that the latter is lifted up and lowered downwardly together with said lever.

7. Apparatus according to claim 6 wherein said connecting means comprises flexible connectors attached to frontal and rear sections of said picking head and the relative lengths of said connectors being such that during lifting of said picking head upwardly, the frontal section of the picking head is initially lifted to cause the picking head and the means for supporting same to rotate rearwardly whereby to assist the same in clearing obstructions on the ground.

8. Apparatus according to claim 1 wherein said means for supporting said picking head on the ground includes a pair of spaced apart skids each of which, in profile, displays a smoothly convexly contoured frontal section merging into more shallowly convexly curved intermediate and rear sections.

9. Apparatus according to claim 1 wherein said conveyor means includes a plurality of rigid sections hinged together to form an endless flexible loop, and sprocket means shaped to operate and engage with said sections to positively drive same in an endless path, certain of said sections being flighted to carry the berries thereon.

10. Apparatus according to claim 1 wherein said cam means moves said tines between open and closed positions during rotation of said reel, said tines pointing in the direction of reel rotation and said cam means being shaped such that during reel rotation the tines open gradually while descending prior to engaging the planets so as to enter the plants with little disturbance and to thereafter close to retain berries stripped therefrom with the tines gradually opening as they ascend to continue to hold the fruit therein, and wherein said cam means is further shaped to cause said tines to first close rapidly and to immediately thereafter open rapidly thereby to effectively release the berries from the tines and deposit same on said conveyor means.

11. Apparatus for harvesting crops such as berries on low plants comprising: a picking head including a frame movable along the ground over the crop of berries in a path of travel and a reel mounted on the frame for rotation about an axis transverse to the path of travel; said reel having a plurality of circumferentially spaced rows of tines thereon adapted to move and to engage the berries and to strip them from the plants, cam means for moving said tines relative to said reel to facilitate the stripping action and to facilitate deposit of the berries into the reel, conveyor means to carry the berries outwardly of the reel and thence into a container, and wherein said frame is provided with spaced apart skids supporting said picking head directly on the ground for sliding movement thereover so that said picking head closely follows the contours of the ground; and means for towing said picking head such that it is free to move upwardly or downwardly and to pitch and roll as said skids move over irregularities on the ground surface.

12. Apparatus according to claim 11 wherein said towing means includes a bracket adapted to be fixed to a tractor and a towing arm adapted to extend outwardly from the tractor, and a towing assembly interconnected between said arm and said frame for towing of the picking head alongside of the tractor with said towing assembly arranged to allow the aforementioned motions of the picking head during movement over the ground as the picking head is towed alongside the tractor.

13. Apparatus according to claim 12 wherein said towing assembly comprises a towing yoke connected to said picking head to permit relative pitching motion therebetween about an axis transverse to the path of travel, and said yoke connected to said arm to permit relative rolling motion and pivotal motion therebetween.

14. Apparatus according to claim 13 wherein said towing yoke is connected at a single point to said arm.

15. Apparatus according to claim 12 further including a stabilizer bar connected to said picking head to prevent substantial lateral motion of same relative to the tractor.

16. Apparatus according to claim 15 further including a hoisting lever adapted to be pivotally connected to said tractor and having a hydraulic ram means connected thereto for raising and lowering said lever, and means for connecting said lever to said frame such that the picking head is lifted up and lowered downwardly together with said lever.

17. Apparatus according to claim 16 wherein said connecting means comprises flexible connectors attached to frontal and rear sections of said picking head and the relative lengths of said connectors being such that during lifting of said picking head upwardly, the frontal section thereof is initially lifted to cause the frame and the skids to rotate rearwardly whereby to assist the skids in clearing obstructions on the ground.

18. Apparatus according to claim 11 wherein said skids, in profile, include a smoothly convexly contoured frontal section merging into a more shallowly convexly curved rear section.

19. Apparatus for harvesting crops such as berries on low plants comprising: a picking head including a frame movable along the ground over the crop of berries in a path of travel and a reel mounted on the frame for rotation about an axis transverse to the path of travel; said reel having a plurality of circumferentially spaced rows of tines thereon pointing in the direction of reel rotation and adapted to move and to engage the berries and to strip them from the plants, cam means for moving said tines relative to said reel to facilitate the stripping action and to facilitate deposit of the berries into the reel, conveyor means to carry the berries outwardly of the reel and thence into a container, wherein said conveyor means includes a belt comprising a plurality of rigid section hinged together to form an endless flexible loop, and sprocket means shaped to cooperate and engage with said belt sections to positively drive same in an endless path, certain of said sections being flighted to carry the berries thereon and wherein said frame is provided with means for supporting said picking head on the ground for movement thereover such that said picking head closely follows the contours of the ground; and means for towing said picking head such that it is free to move upwardly or downwardly and to pitch and roll as said means for supporting the picking head moves over irregularities on the ground surface.

20. Apparatus for harvesting berries on low plants such as lowbush (i.e. wild) blueberries comprising: a picking head including a frame movable along the ground over the crop of berries in a path of travel and a reel mounted on the frame for rotation about an axis transverse to the path of travel; said reel having a plurality of circumferentially spaced rows of tines thereon adapted to move and to engage the berries and to strip them from the plants, cam means for moving said tines relative to said reel to facilitate the stripping action and to facilitate deposit of the berries into the reel; conveyor means to carry the berries outwardly of the reel and thence into a container, and wherein said cam means for moving said tines are shaped such that during reel rotation the tines open gradually while descending prior to engaging the plants so as to enter the plants with little disturbance and thereafter close to retain berries stripped therefrom with the tines gradually opening as they ascend to continue to hold the berries therein, and wherein said cam means is further shaped to cause said tines to first close rapidly and to immediately thereafter open rapidly shortly before completing their ascent thereby to effectively release the berries from the tines and deposit same on said conveyor, means.

21. The apparatus of claim 20 wherein said conveyor means extends generally axially within the reel and includes means adapted to receive and direct the berries after they have been released from the tines.

22. Apparatus according to claim 20 further including a rotary brush arranged to rotate with its bristles in contact with a peripheral portion of the reel to clear debris from the tines as said tines are moving adjacent to and through a top dead center portion of their path of travel.

23. Apparatus for harvesting crops such as berries on low plants comprising: a picking head including a frame movable along the ground over the crop of berries in a path of travel and a reel mounted on the frame for rotation about an axis transverse to the path of travel; said reel having a plurality of circumferentially spaced rows of tines thereon adapted to move and to engage the berries and to strip them from the plants, cam means for moving said tines relative to said reel to facilitate the stripping action and to facilitate deposit of the berries into the reel, conveyor means to carry the berries outwardly of the reel and thence into a container, and variable speed motor means for driving said reel and control means associated with said motor means enabling the speed of at least said reel to be adjusted relative to the rate of travel of the picking head along the ground to optimize the stripping action and wherein said frame is provided with means for supporting said picking head on the ground for movement thereover such that said picking head closely follows the contours of the ground; and means for towing said picking head such that it is free to move upwardly or downwardly and to pitch and roll as said means for supporting the picking head moves over irregularities on the ground surface.

* * * * *